(12) United States Patent
Thiele

(10) Patent No.: US 8,477,135 B2
(45) Date of Patent: Jul. 2, 2013

(54) METHOD AND APPARATUS FOR VOLUME RENDERING USING DEPTH WEIGHTED COLORIZATION

(75) Inventor: Karl E. Thiele, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1247 days.

(21) Appl. No.: 12/302,946

(22) PCT Filed: May 29, 2007

(86) PCT No.: PCT/IB2007/052021
§ 371 (c)(1),
(2), (4) Date: Dec. 1, 2008

(87) PCT Pub. No.: WO2007/138551
PCT Pub. Date: Dec. 6, 2007

(65) Prior Publication Data
US 2009/0184955 A1 Jul. 23, 2009

Related U.S. Application Data

(60) Provisional application No. 60/803,514, filed on May 31, 2006.

(51) Int. Cl.
G06T 15/50 (2011.01)
G06T 15/60 (2006.01)
G06T 17/00 (2006.01)
G09G 5/02 (2006.01)

(52) U.S. Cl.
USPC ............................ 345/426; 345/424; 345/592

(58) Field of Classification Search
None
See application file for complete search history.

(56) References Cited

U.S. PATENT DOCUMENTS

| 4,596,145 | A | 6/1986 | Smith |
| 5,995,108 | A * | 11/1999 | Isobe et al. ............... 345/421 |
| 6,177,923 | B1 * | 1/2001 | Arenson et al. ........... 345/589 |
| 6,868,191 | B2 | 3/2005 | Nister |
| 2003/0125055 | A1* | 7/2003 | Kim et al. ................. 455/466 |
| 2003/0235341 | A1* | 12/2003 | Gokturk et al. ........... 382/243 |
| 2005/0068319 | A1 | 3/2005 | Kim |
| 2005/0134582 | A1 | 6/2005 | Claus |
| 2005/0156927 | A1 | 7/2005 | Lee |

OTHER PUBLICATIONS

Lum et al. Hardware-Accelerated Parallel Non-Photorealistic Volume Rendering; NPAR'02 Proceedings of the 2nd International Symposium on Non-photorealistic Volume Rendering; ACM New York USA 2002.*

Hooch et al. Using Non-Photorealistic Rendering to Communicate Shape; ACM SIGGRAPH 1999 Course Notes, Course on Non-Photorealistic Rendering; 1999.*

(Continued)

*Primary Examiner* — Carlos Perromat

(57) ABSTRACT

A method of volume rendering includes obtaining data representative of a first composited plane of one or more anatomical structures and calculating data of a second composited plane as a function of a first composited plane. The data of the second composited plane is indicative of a measure of depth of the one or more anatomical structures along respective ray cast lines. The method also includes determining depth weighted color values between two different colorization palettes as a function of the measure of depths of the second composited plane. The determined depth weighted color values are applied to the first composited plane for producing a volume rendering image with depth weighted colorization.

20 Claims, 8 Drawing Sheets

OTHER PUBLICATIONS

M. Kohn; YUV <—> RGB Javascript Converter; http://www.mikekohn.net/file_formats/yuv_rgb_converter.php; retrieved May 30, 2012.*

Anonymous; WorkWithColor, Doughnut Color Picker; http://www.workwithcolor.com/doughnut-color-picker-01.htm; retrieved May 30, 2012.*

Foley et al.; Computer Graphics: Principles and Practice; 2nd Ed.; Addison-Wesley; Jul. 1997; pp. 574-595.*

Csebfalvi, B. et al, "Fast Visualization of Object Contours by Non-Photorealistic Volume Rendering", Eurographics 2001, vol. 20, No. 3, pp. 1-9.

Levoy, M. "Display of Surfaces from Volume Data" IEEE Computer Graphics and Applications. vol. 8, No. 3, May 1998, pp. 29-37.

* cited by examiner

METHOD AND APPARATUS FOR VOLUME RENDERING USING DEPTH WEIGHTED COLORIZATION

The present embodiments relate generally to medical systems and more particularly, to a method and apparatus for volume rendering using depth weighted colorization.

Levoy developed the concept of Volume Rendering in the late 1980's, which allowed one to create a 3D-like image directly from a 3D object (i.e., a 3D matrix of numbers). Previous methods required the 3D Volume to be first converted into a set of discrete and quantized surfaces (e.g. Marching Cubes algorithm). Levoy adopted an optical physics model of how the eye/retina sees the visual world, where the model describes a method by which a ray cast line (corresponding to a single pixel of the image plane) would intersect the volume in a manner dependent upon the viewer's location with respect to the 3D object being visualized. The value assigned to the pixel would involve a Compositing operation, which would integrate the interpolated samples along the ray cast line. Such a method is typically used for almost all 3D medical imaging applications.

Since Levoy's landmark paper, numerous articles have been written describing various methods for enhancing the visual depth cues, that is, for assisting the viewer in determining how far, or how close, a structure is relative to the viewer. Although not exhaustive, the following list highlights some of the more popular techniques for conveying the sense of depth: foreground occlusion (e.g., a near structure obscures a far structure); stereo-scopic viewing (e.g., typically requiring complex viewing methods); perspective (e.g., farther structures are smaller); object recognition (e.g. a chair); swivel (e.g., artificial motion); defocusing (e.g., for far structures); depth shading (e.g., farther structures are darkened/shadowed); and gradient lighting.

Such techniques don't work as well when: (a) using standard 2-D monitors and LCD displays; (b) there is a lack of contrast resolution to support a heavily segmented display (e.g., differentiating between translucent and opaque structures); (c) the 3D object is not easily recognizable (e.g. internal anatomical structures); (e) the volume is noisy; or (f) the structure is static.

Accordingly, an improved method and system for overcoming the problems in the art is desired. In particular, an improved method of differentiating the depth of structures when using volume rendering is desired.

Figure 7:
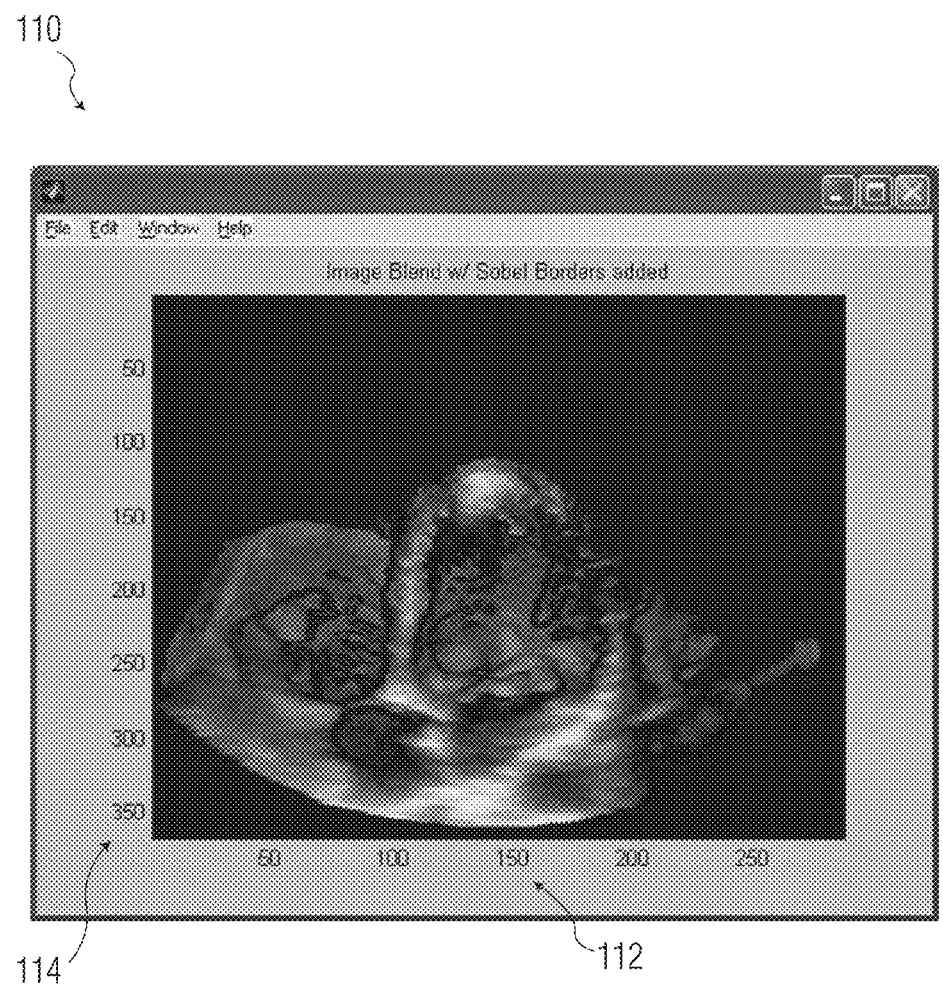
Figure 8:
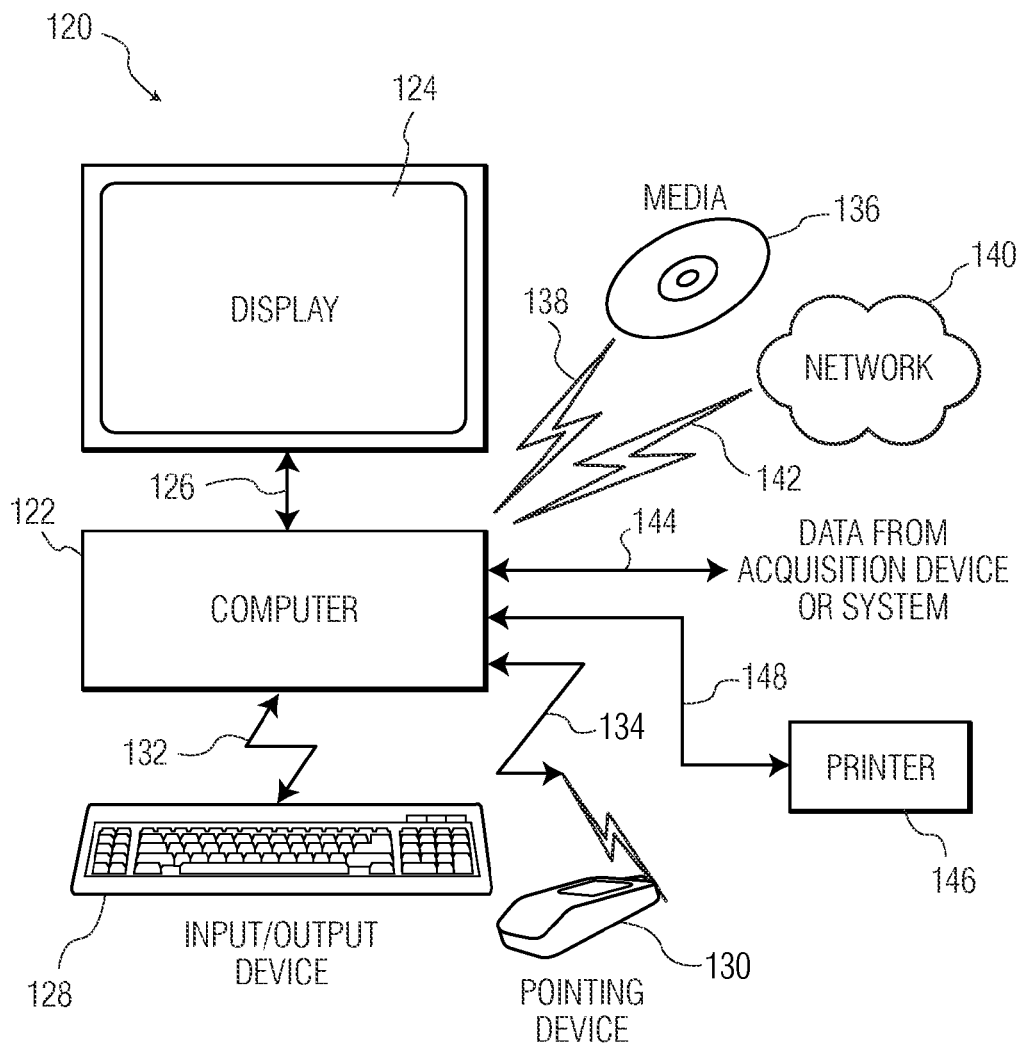

FIG. 7 is a 2D screen shot view 110 of an example of a Sobel modified depth colorization volume rendering obtained with the method and system for volume rendering using depth weighted colorization according to another embodiment of the present disclosure; and FIG. 8 is a block diagram view of a system for implementing the method of volume rendering using depth weighted colorization according to the embodiments of the present disclosure.

In the figures, like reference numerals refer to like elements. In addition, it is to be noted that the figures may not be drawn to scale.

Figure 1:
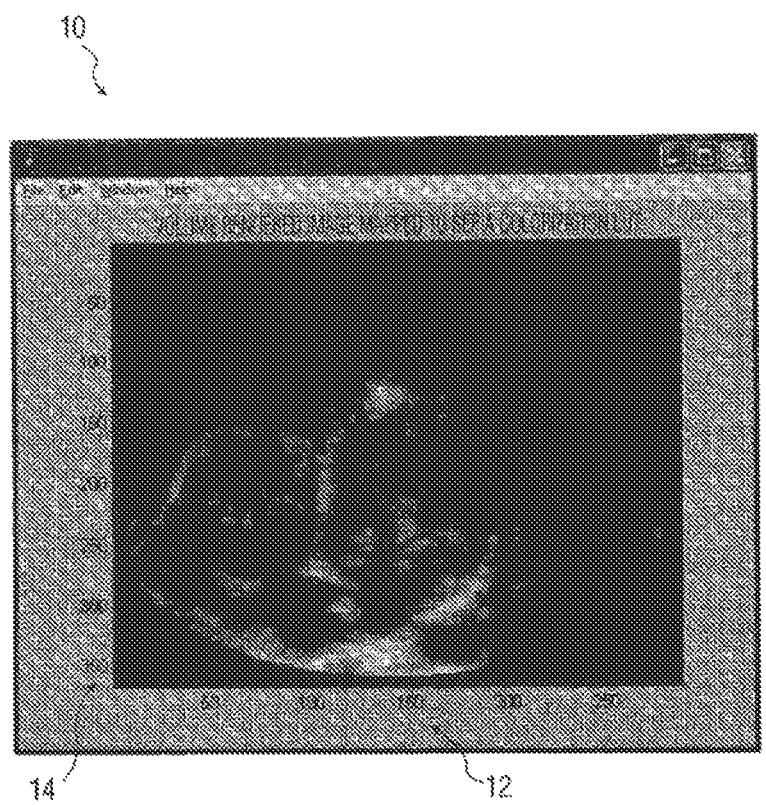
FIG. 1 is a two-dimensional (2D) screen view of a three-dimensional (3D) ultrasound image as is known in the art.

FIG. 1 is a two-dimensional (2D) screen view 10 of a three-dimensional (3D) ultrasound image as is known in the art. In particular, the image comprises a volume rendered image mapped to a sepia colorization Look-Up-Table (LUT), wherein the horizontal axis, generally indicated by reference numeral 12, is representative of a dimension of length, and can be described in units of millimeters or units or horizontal pixels on a display screen. The vertical axis, generally indicated by reference numeral 14, is also representative of a dimension of length, and can be described in units of millimeters or units or vertical pixels on a display screen. While the image appears to look three-dimensional, a review of the structures contained therein is not very helpful with respect to determining whether the structures appear close to a viewer (i.e., a view location), or far away.

Figure 2:
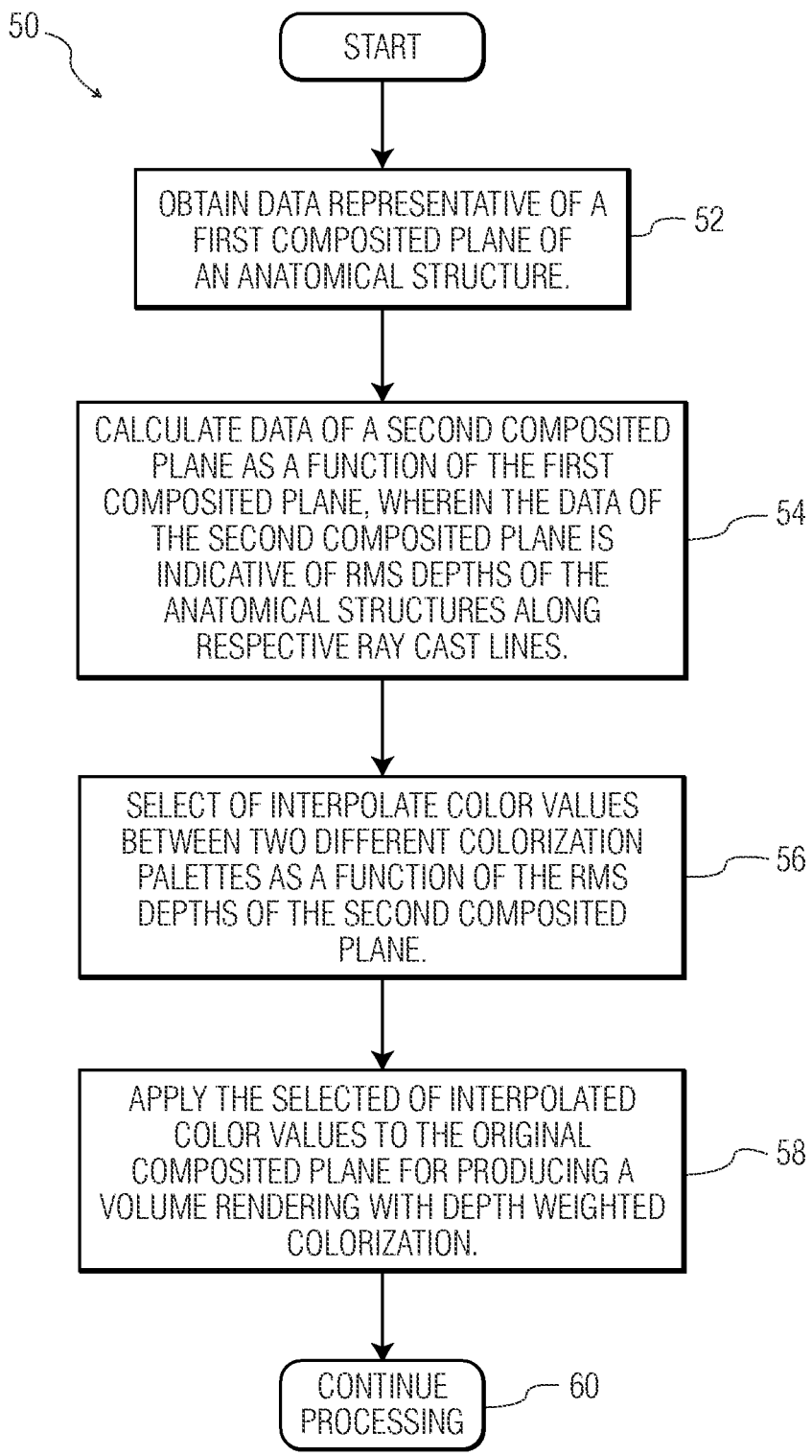
FIG. 2 is a flow diagram view of a method for volume rendering using depth weighted colorization according to one embodiment of the present disclosure.

FIG. 2 is a flow diagram view 50 of a method for volume rendering using depth weighted colorization according to one embodiment of the present disclosure. The method of volume rendering comprises obtaining data representative of a first composited plane of one or more anatomical structures, generally indicated by reference numeral 52. In one embodiment, the first composited plane comprises an original composited plane. In another embodiment, obtaining data comprises obtaining data from a source using one selected from the group consisting of three-dimensional (3D) ultrasound, matrix arrays and real-time 3D imaging.

In a next step 54, the method comprises calculating data of a second composited plane as a function of a first composited plane, wherein the data of the second composited plane is indicative of root-mean square (RMS) depths of the one or more anatomical structures along respective ray cast lines.

The method further includes, in step 56, selecting or interpolating color values between two different colorization palettes as a function of the RMS depths of the second composited plane. In particular, the step includes determining depth weighted color values between two different colorization palettes as a function of the RMS depths of the second composited plane. In one embodiment, determining comprises one selected from the group consisting of (i) selecting and (ii) interpolating the depth weighted color values between the two different colorization palettes as a function of the RMS depths of the second composited plane. In another embodiment, determining depth weighted color values between two different colorization palettes as a function of the RMS depths further comprises using a two-dimensional (2D) colorization look-up table (LUT). In yet another embodiment, determining depth weighted color values between two different colorization palettes as a function of the RMS depths further comprises (i) performing a one-dimensional (ID) look-up table (LUT) operation for each of the two different colorization palettes and (ii) linearly interpolating the results from the ID LUT operations.

The method still further includes, in step 58, applying the selected or interpolated color values to the original composited plane for producing a volume rendering with depth weighted colorization. In particular, the step includes applying the determined depth weighted color values to the first composited plane for producing a volume rendering image with depth weighted colorization. In one embodiment, applying the determined depth weighted color values comprises applying one selected from the group consisting of the (i) selected color values and (ii) interpolated color values to the first composited plane for producing the volume rendering with depth weighted colorization. In step 60, further processing according to the particular requirements of a given volume rendering procedure can be performed.

According to one embodiment of the present disclosure, a compositing method derived from volume rendering techniques includes calculating a second composited plane that is indicative of the RMS depth of the anatomical structure along a ray cast line. This second plane (RMS Depth) is used to select or interpolate between two different colorization palettes that are then applied to an original Levoy composited plane.

As will be understood in connection with the embodiments of the present disclosure, changes in hue (i.e., colorization) are advantageously used to differentiate foreground versus background structures. While changes in hue have been used in Volume Rendering, changes in hue have not been used as a function of depth. Classical Volume Rendering often refers to a "classification" stage, where prior to compositing, the quantity at a voxel is converted into an RGB triplet, and then separate compositing occurs for each R, G, and B value. This conversion either depends upon the immediate value of the scalar, or can depend upon a segmented value, which typically is a separate volume used to differentiate between different structures. For example, voxels identified as bone may be encoded using a gray or white palette, whereas voxels from coronaries and arteries would be encoded using a predominantly Red palette.

Levoy teaches that recursive compositing of voxels along a ray cast line can be performed as follows:

$$L_{i+1} = L_i * (1-\sigma_i)$$

$$S_{i+1} = S_i + L_i \sigma_i \rho_i$$

where:
L light entering/exiting voxel
S composited sum
i index indicating input to voxel
i+1 index indicating output of voxel
sigma opacity of voxel, typically a function of rho (the voxel scalar)
rho scalar attribute of the voxel Note that this requires recursion to calculate the final $S_N$ (summed composited value corresponding to a single pixel).

Noting that the contribution from each voxel:

$$C_i = L_i \sigma_i \rho_i$$

Hence, the final summed value can be simply described:

$$S_N = \sum_{i=1}^{N} C_i$$

Statistics teach that the mean of a function can be calculated by:

$$\bar{x} = \frac{\sum x_i \rho_i}{\sum \rho_i}$$

Applying the same idea to volume compositing, one can calculate the RMS depth for the ray cast line:

$$\bar{i} = \frac{\sum_{i=1}^{N} i C_i}{\sum_{i=1}^{N} C_i}$$

Where $\bar{i}$ corresponds to the RMS index along the ray cast line (i.e. depth), and which indicates the average index where most of the contribution for the composited sum is obtained.

$$Pixel(x,y) = RGB\_LUT(S_i, \bar{i})$$

Since one knows a priori the distance between ray cast samples, it is easy to convert $\bar{i}$ to a real depth. However, we are really interested more in the percentage of $\bar{i}$ as a ratio of N (total # of samples along the ray cast).

Figure 3:
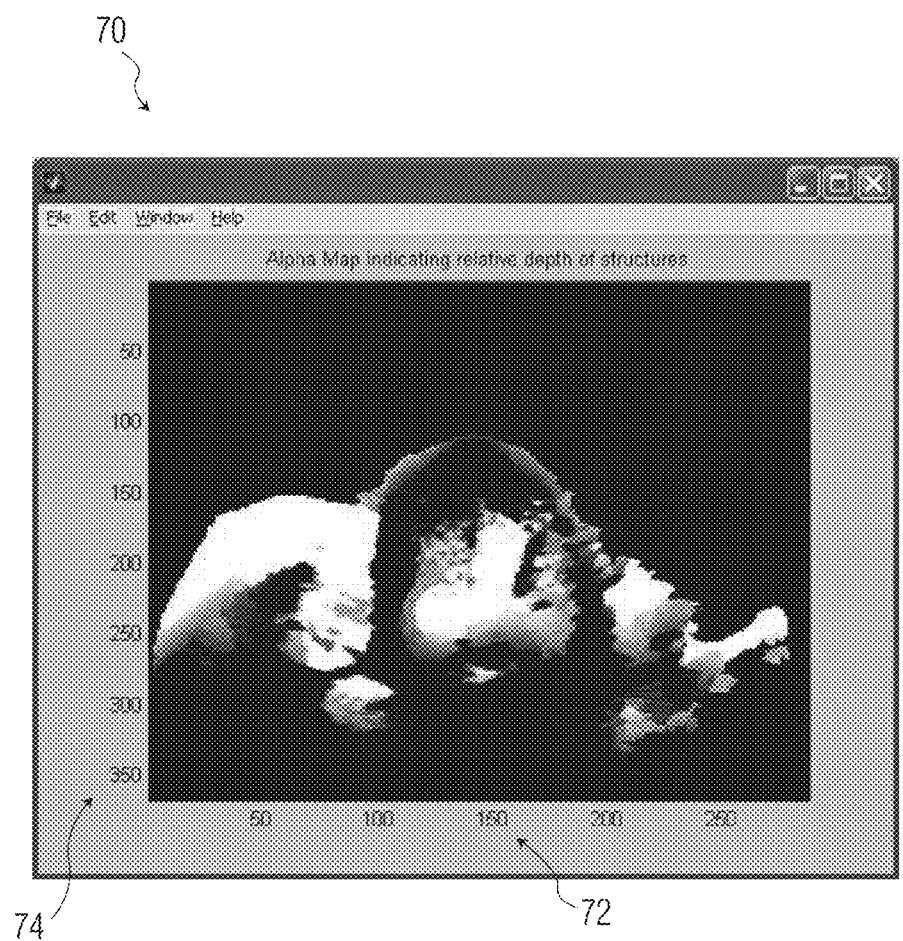
FIG. 3 is a 2D screen view of an example of a depth map indicating a relative depth of structures and for use in the method and system for volume rendering using depth weighted colorization according to an embodiment of the present disclosure.

FIG. 3 is a two-dimensional (2D) screen view 70 of an example of a depth map for use in the method and system for volume rendering using depth weighted colorization according to an embodiment of the present disclosure. In particular, FIG. 3 contains an alpha map indicating relative depths of structures, wherein the horizontal axis, generally indicated by reference numeral 72, is representative of a dimension of length, and can be described in units of millimeters or units or horizontal pixels on a display screen. The vertical axis, generally indicated by reference numeral 74, is also representative of a dimension of length, and can be described in units of millimeters or units or vertical pixels on a display screen. The depth map of FIG. 3 was obtained using the equations described above, i.e., on image data of FIG. 1, further in which the equations were used to calculate the RMS depth. In FIG. 3, the darker structures are close to the viewer (i.e., view location) and the brighter structures are far away.

Figure 4:
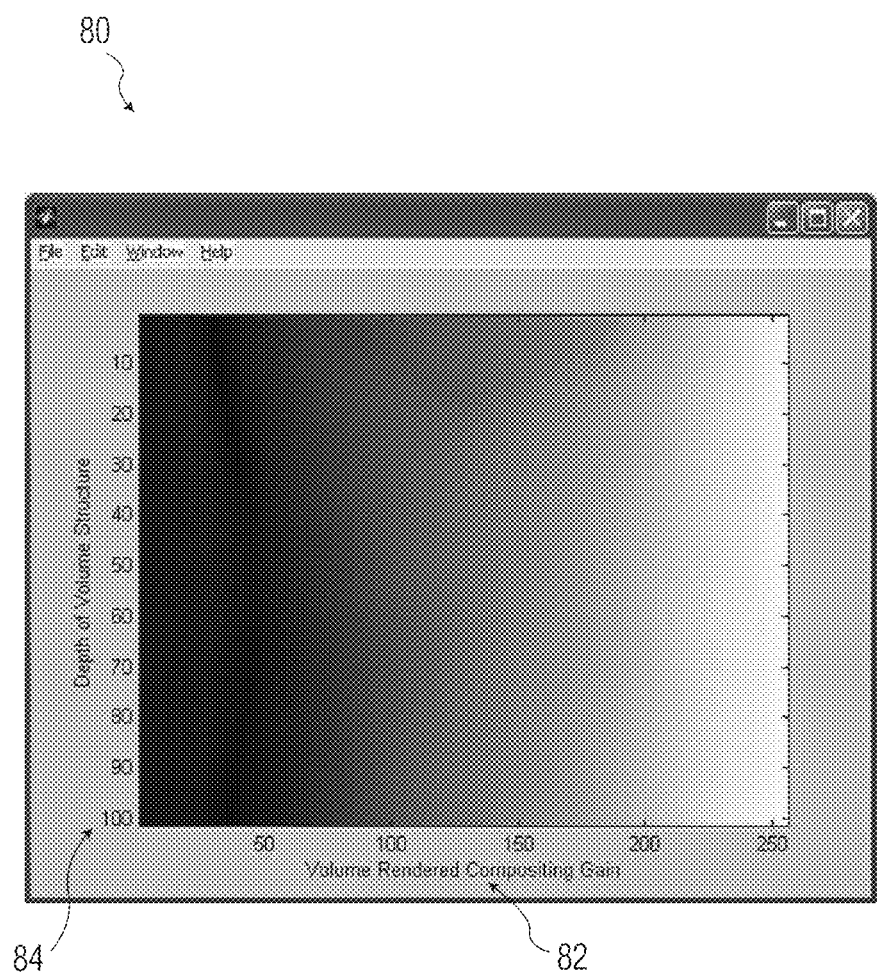
FIG. 4 is a 2D screen shot view of an example of a 2D colorization look-up table (LUT) for use in the method and system for volume rendering using depth weighted colorization according to an embodiment of the present disclosure.

FIG. 4 is a 2D screen shot view 80 of an example of a 2D colorization look-up table (LUT) for use in the method and system for volume rendering using depth weighted colorization according to an embodiment of the present disclosure. In particular, the horizontal axis, generally indicated by reference numeral 82, is representative of volume rendered compositing gain, from 0 to approximately just over 250. The Summed Composited Value, $S_N$, is scaled to this 0 to 250 range (min to max) and this value determines the horizontal index (column) in the 2D colorization LUT. Note how smaller values (closer to 0) correspond to smaller composited values, and thus use RGB values that are darker and have lower luminescence values. The vertical axis, generally indicated by reference numeral 84, is representative of a depth of volume structure, from 0 to 100. The RMS Depth Value, $\bar{i}$, is inversely mapped to this 0 to 100 range. As such, small values of $\bar{i}$ are mapped to values near one-hundred (100), and high values of $\bar{i}$ are mapped to values near zero (0). A result of this mapping is that structures closer to the viewer (i.e., view location) will result in warmer-redder colors hues, and that structures farther from the viewer (i.e., view location) will be assigned colder-bluer hues. In one embodiment, selecting or interpolating color values between two different colorization palettes comprises using any standard colorization map (bottom edge), create its complement (top edge), and then linearly interpolate between the standard colorization map and its complement.

Figure 5:
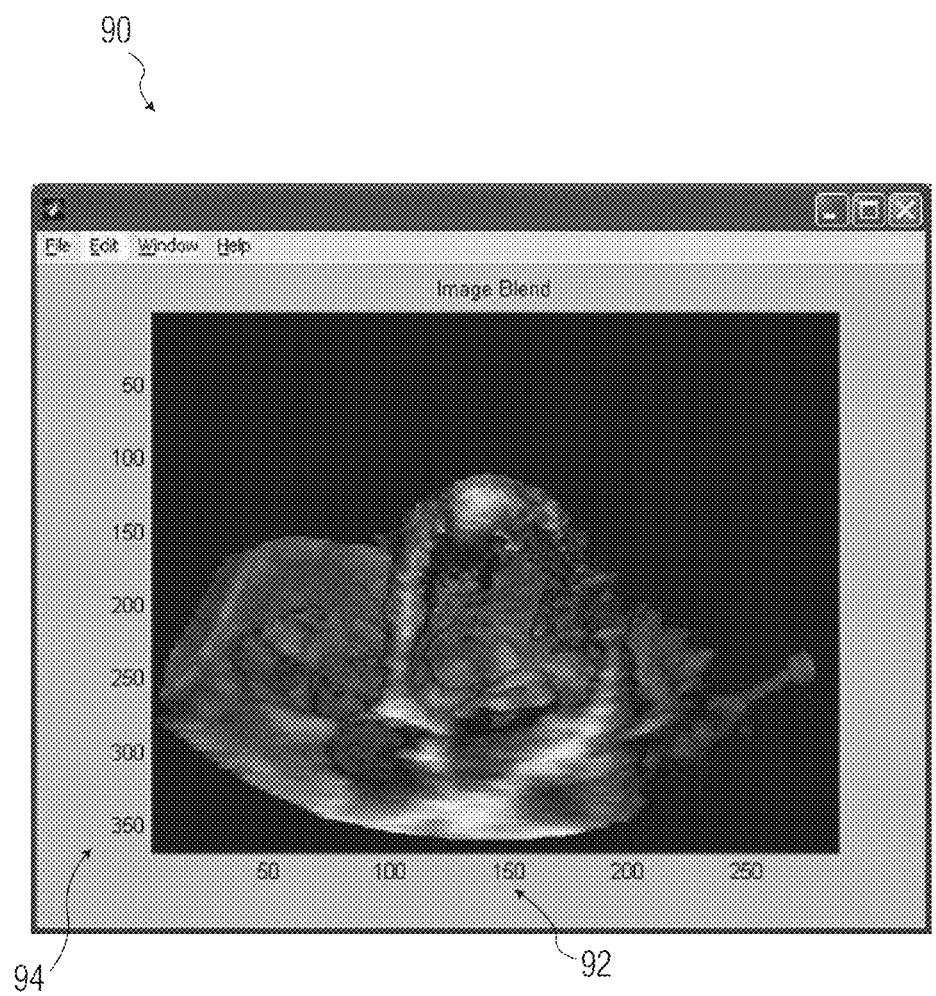
FIG. 5 is a 2D screen shot view of an example of a depth colorization volume rendering obtained with the method and system for volume rendering using depth weighted colorization according to one embodiment of the present disclosure.

FIG. 5 is a 2D screen shot view 90 of an example of a depth colorization volume rendering obtained with the method and system for volume rendering using depth weighted colorization according to one embodiment of the present disclosure. In particular, screen shot view 90 contains an image blend, wherein the horizontal axis, generally indicated by reference numeral 92, is representative of a dimension of length, and can be described in units of millimeters or units or horizontal pixels on a display screen. The vertical axis, generally indicated by reference numeral 94, is also representative of a dimension of length, and can be described in units of millimeters or units or vertical pixels on a display screen. In one embodiment, the depth colorization volume rendering image of FIG. 5 was obtained using the "amplitude" of the composited ray-cast, using the calculated depth map, and performing a 2-dimension look up into the above 2D colorization map of FIG. 4. Accordingly, the depth structures of FIG. 5 now "pop", and the depth location is more notable.

Figure 6:
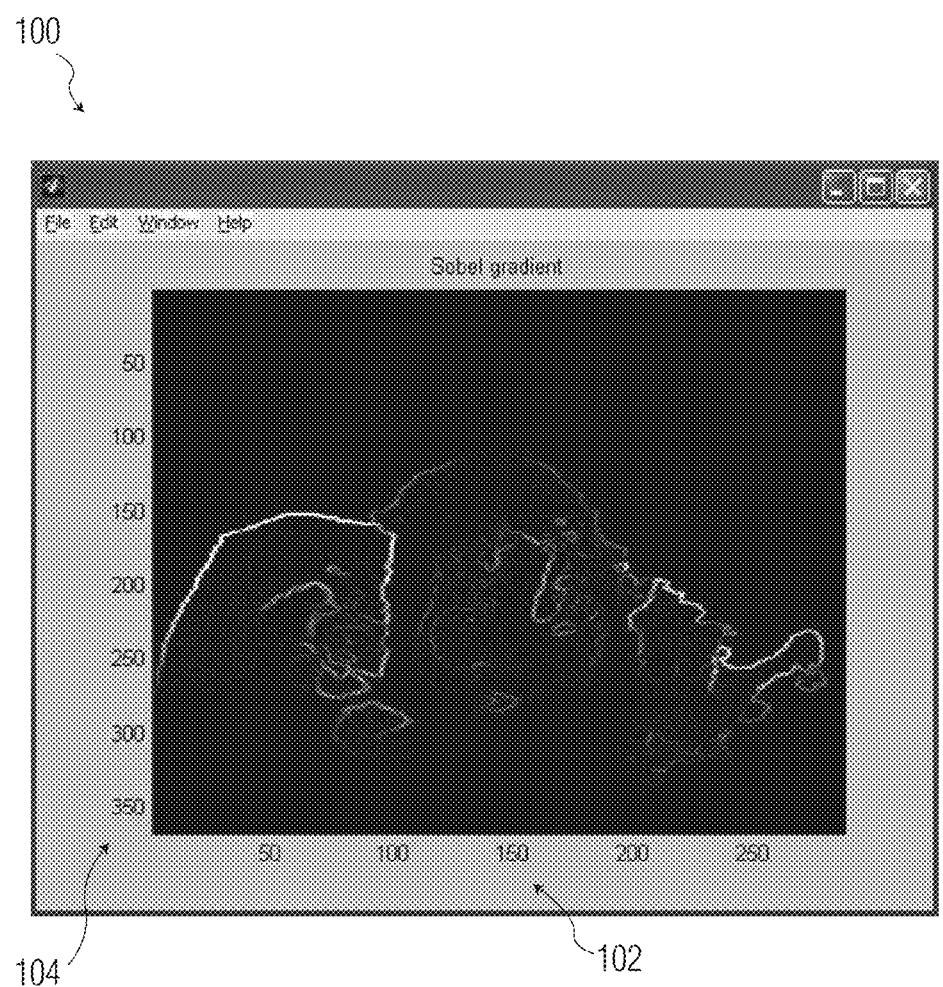
FIG. 6 is a 2D screen shot view of an example of a Sobel operator for use in the method and system for volume rendering using depth weighted colorization according to another embodiment of the present disclosure.

FIG. 6 is a 2D screen shot view 100 of an example of a Sobel operator for use in the method and system for volume rendering using depth weighted colorization according to another embodiment of the present disclosure. In particular, screen shot view 100 contains a Sobel gradient, wherein the horizontal axis, generally indicated by reference numeral 102, is representative of a dimension of length, and can be described in units of millimeters or units or horizontal pixels on a display screen. The vertical axis, generally indicated by reference numeral 104, is also representative of a dimension of length, and can be described in units of millimeters or units or vertical pixels on a display screen. In one embodiment, the method further includes calculating the gradient of the Depth Map of FIG. 3. High gradients occur in locations where the depth changes abruptly and dramatically. In classical Levoy compositing, two (2) adjacent structures having identical composited luminance might be located in the volume at significantly different depths from the viewer (or view location). But because of the similar luminance values, it would be difficult to distinguish the different depths from the resultant Levoy composited image. By using the Sobel operator, or other 2D gradient-detecting operators, upon the RMS depth image, the method according to another embodiment of the present disclosure more readily identifies abrupt changes in depth, and highlights such changes to the viewer with the addition of prescribed borders to the depth weighted colorization image.

FIG. 7 is a 2D screen shot view 110 of an example of a Sobel modified depth colorization volume rendering obtained with the method and system for volume rendering using depth weighted colorization according to another embodiment of the present disclosure. In particular, screen shot view 110 contains an image blend with Sobel borders added, wherein the horizontal axis, generally indicated by reference numeral 112, is representative of a dimension of length, and can be described in units of millimeters or units or horizontal pixels on a display screen. The vertical axis, generally indicated by reference numeral 114, is representative of a dimension of length, and can be described in units of millimeters or units or vertical pixels on a display screen. In one embodiment, the Sobel gradient image is used to enhance those portions of the depth colorization volume rendering image where the depth changes dramatically. This is accomplished by using a multiplicative mask operation, where strong gradients are used to darken the red-green-blue colorization (RGB) values.

Accordingly, the method for volume rendering with depth weighted colorization according to another embodiment further comprises using a Sobel gradient on the volume rendering image with depth weighted colorization to identify abrupt changes in depth. In addition, the method includes further enhancing the volume rendering image with depth weighted colorization image as a function of the identified abrupt changes in depth. In a further embodiment, abrupt changes in depth comprise changes in depth can comprise on the order of one hundred percent (100%) between adjacent ray cast lines. In this case, the structure associated with the first ray cast is located at a relative depth of zero (0) to the viewer (i.e., as close to the viewer or view location as possible), and the structure associated with the second ($2^{nd}$) adjacent ray cast line has a relative depth of one hundred (100) (i.e., as far away from the viewer or view location as possible). In one embodiment of the present disclosure, a method includes application of Sobel detected depth boundaries to a depth weighted colorization image as discussed herein. In another embodiment of the present disclosure, another method includes the application of the Sobel detected depth boundaries to a standard Levoy image (not shown).

According to another embodiment, the method for volume rendering with depth weighted colorization, further comprises preserving, within the volume rendering image with depth weighted colorization, an average luminance of the first composited plane independent of depth. For example, in one embodiment, preserving the average luminance includes selecting the two different colorization palettes to comprise a first colorization map and a second colorization map, wherein the second colorization map is the complement of the first colorization map. Furthermore, the method can comprise selecting the first colorization map and generating the complement of the first colorization map. Generating comprises, for example, converting the first colorization map, in classical RGB space, according to a desired luminance/chrominance transform, wherein converting produces transformed data into a YUV, where the "Y" value corresponds to the luminance, and the "U" and "V" values represent the hue and/or saturation. Note that a standard Black-and-White image can be generated simply by using the "Y" value only. The complement LUT map involves swapping the two (2) hue signals "U" and "V", while preserving the luminance signal "Y". Then an inverse transformation is performed on the YVU signal to generate RGB values for the complement map.

In yet another embodiment, the method for volume rendering with depth weighted colorization, further includes the two different colorization palettes comprising (i) a first colorization map and (ii) a second colorization map, wherein the second colorization map is a complement of the first colorization map. Accordingly, the method further includes generating the complement of the first colorization map to acquire the second colorization map. Furthermore, generating includes converting the first colorization map according to a desired luminance/chrominance transform, wherein converting produces transformed data; swapping the chrominance components of the transformed data to obtain its complement; and converting the transformed data back to an original space (e.g., RGB) used in the first colorization map. As a result, an average luminance is preserved independent of depth. In one embodiment, the desired luminance/chrominance transform comprises a colorization/ultraviolet (YUV) transform, further wherein swapping the transformed data comprises swapping ultraviolet (UV) data.

FIG. 8 is a block diagram view of a system for implementing the method of volume rendering using depth weighted colorization according to the embodiments of the present disclosure. That is, the method according to the embodiments of the present disclosure can also be implemented by a clinical workstation or system for implementing a clinical task, as well as be produced in the form of a computer program product. Accordingly, FIG. 8 is a partial block diagram view of an apparatus 120 featuring volume rendering with depth weighted colorization according to an embodiment of the present disclosure. Apparatus 120 includes a computer/control unit 122, a display 124, wherein the display 124 is coupled to the computer/control unit 122 via a suitable connection 126. Apparatus 120 further includes an input/output device 128 and a pointing device 130, wherein the input/output device 128 and the pointing device 130 are coupled to the computer/control unit 122 via suitable connections 132 and 134, respectively. Suitable connections can comprise any suitable signal line or lines (wire, wireless, optical, etc.).

In addition, computer/control unit 122 comprises any suitable computer and/or control unit that can be configured for performing the various functionalities as discussed herein with respect to the method for producing a volume rendering image with depth weighted colorization according to the various embodiments. Furthermore, programming of the computer/control unit 122, for performing the methods according to the embodiments of the present disclosure as discussed herein, can be accomplished with use of suitable programming techniques. Moreover, computer/control unit 122 interfaces with input/output device 128 (such as a keyboard, audio/voice input device, or similar device), pointing device 130 (such as a mouse, touch screen, or similar device) and display device 124, the computer/control unit for providing imaging data signals to the display for visual display.

The computer/control unit 122 may further send/receive data from one or more of a mass storage device or media 136 via suitable signal coupling generally indicated by reference numeral 138, and/or a computer network 140 (i.e., for remote data acquisition, storage, analysis, and/or display), etc., via suitable signal coupling generally indicated by reference numeral 42. The computer/control unit 122 may further receive data from one or more acquisition device and/or system (not shown), in addition to sending data to one or more device and/or system (not shown), via signal line 144. Signal line 144 can comprise any suitable signal line or lines (wire, wireless, optical, etc.). Still further, system 120 may include a printer device 146 coupled to computer/control unit 122 for suitable use, as may be desired, during a particular procedure involving use of apparatus 120.

According to another embodiment, a volume rendering apparatus comprises a display; a computer/control unit coupled to the display, wherein the computer/control unit provides data to the display for rendering a projection view; and an input device coupled to the computer/control unit for providing inputs to the computer/control unit, wherein the computer control unit is programmed with instructions for carrying out the method for producing a volume rendering image with depth weighted colorization as discussed herein.

According to yet another embodiment, a computer program product comprises computer readable media having a set of instructions that are executable by a computer for carrying out the method for producing a volume rendering image with depth weighted colorization as discussed herein.

Although only a few exemplary embodiments have been described in detail above, those skilled in the art will readily appreciate that many modifications are possible in the exemplary embodiments without materially departing from the novel teachings and advantages of the embodiments of the present disclosure. For example, the embodiments of the present disclosure can be applied to any application involving volume rendering as first described by Levoy. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. A method of volume rendering using depth weighted colorization, the method comprising acts of:
obtaining first data representative of a first composited plane of one or more opaque structures along ray cast lines, the data is selected from the one of three-dimensional (3D) ultrasound matrix arrays and real-time 3D imaging;
calculating second data representative of a second composted plane as a function of the first composited plane indicative of root-mean square (RMS) depth of the one or more opaque structures along the respective ray cast lines;
determining depth weighted color value between two different colonization palettes as a function of the measure of the RMS depth; and
generating one or more volume rendering images with depth weighted colorization.

2. The method of claim 1, further comprising an act of determining a measure of average depth of the one or more opaque structures along the ray cast lines from the view location using modified Levoy compositing equations.

3. The method of claim 1, wherein the one or more opaque structures along the ray cast lines comprise one or more voxels of a three-dimensional object.

4. The method of claim 1, further comprising an act of: generating a depth weighted image from the second data of the second composited plane.

5. The method of claim 4 further comprising an act of: identifying, as a function of the depth weighted image, at least one or more boundaries or edges between structures having different depths from the view location,
wherein the act of identifying includes using a two-dimensional gradient operator on the depth weighted image.

6. The method of claim 5, further comprising an act of: generating a depth weighted volume rendering image by applying the second data of the second composited plane to the first composited plane.

7. The method of claim 6, further comprising acts of:
determining depth weighted color value between two different colorization palettes as a function of the measure of depth of the one or more opaque structures along the ray cast lines; and applying the depth weighted color value for generating the volume rendering image with depth weighted colorization.

8. The method of claim 7, wherein the act of determining the depth weighted color value includes an act of using a two-dimensional (2D) colorization look-up-table (LUT) map.

9. The method of claim 8, wherein the act of generating the 2D colorization LUT map includes acts of:
selecting a one-dimensional colorization map,
generating its complement, and
interpolating between the one-dimensional colorization map and its complement.

10. The method of claim 8, wherein the act of generating the 2D colorization LUT map includes an act of selecting a one-dimensional colorization map and the one-dimensional colorization map comprises a YUV map that transforms YUV to YVU where Y represents luminance and U and V represent hue values.

11. The method of claim 1, wherein the act of generating comprises an act of applying the second data of the second composited plane to the first composited plane.

12. The method of claim 11, wherein the act of applying includes applying the depth weighted color value for generating the volume rendering image with depth weighted colorization.

13. The method of claim 1, wherein the act of determining includes acts of generating and using a two-dimensional (2D) colorization look-up-table (LUT) map.

14. The method of claim 13, wherein the act of generating the 2D colorization LUT map includes acts of:
selecting a one-dimensional colorization map,
generating its complement, and
interpolating between the one-dimensional colorization map and its complement.

15. The method of claim 13, wherein the act of generating the 2D colorization LUT map includes an act of selecting a one-dimensional colonization map and the one-dimensional colorization map comprises a YUV map that transforms YUV to YVU, where Y represents luminance and U and V represent hue values.

16. An apparatus comprising:
a display;
a computer/control unit coupled to the display, wherein the computer/control unit provides data to the display for rendering a screen view; and
an input coupled to the computer/control unit for providing inputs to the computer/control unit, wherein the computer/control unit is programmed with instructions, responsive to said input, to:
obtain first data representative of a first composited plane of one or more opaque structures along ray cast lines, the data is selected from the one of three-dimensional (3D) ultrasound matrix arrays and real-time 3D imaging;
calculate second data representative of a second composited plane as a function of the first composited plane indicative of root-mean square (RMS) depth of the one or more opaque structures along the respective ray cast lines;
determine depth weighted color value between two different colorization palettes as a function of the measure of the RMS depth; and
render to the display one or more volume rendering images with depth weighted colorization.

17. A computer program product stored on a non-transitory computer readable media, the program product having a set of instructions that are executable by a computer for carrying out a method of volume rendering using depth weighted colorization, the method comprising acts of:
obtaining first data representative of a first composited plane of one or more opaque structures along ray cast lines, the data is selected from the one of three-dimensional (3D) ultrasound matrix arrays and real-time 3D imaging;
calculating second data representative of a second composited plane as a function of the first composited plane indicative of root-mean square (RMS) depth of the one or more opaque structures along the respective ray cast lines;
determining depth weighted color value between different colorization palettes as a function of the measure of the RMS depth; and
generating one or more volume rendering images with depth weighted colorization.

18. The computer program product of claim 17, wherein the act of generating comprises an act of: applying the second data of the second composited plane to the first composited plane.

19. The computer program product of claim 18, wherein the act of applying includes applying the depth weighted color value for generating the volume rendering image with depth weighted colorization.

20. The computer program product of claim 19, wherein act of generating includes acts of generating and using a two-dimensional (2D) colorization look-up-table (LUT) map.

* * * * *